United States Patent [19]

Arnold

[11] 4,375,521

[45] Mar. 1, 1983

[54] VEGETABLE OIL EXTENDED POLYURETHANE SYSTEMS

[75] Inventor: James M. Arnold, Mableton, Ga.

[73] Assignee: Communications Technology Corporation, Los Angeles, Calif.

[21] Appl. No.: 269,244

[22] Filed: Jun. 1, 1981

[51] Int. Cl.³ .............................................. C08G 18/06
[52] U.S. Cl. .................................... 523/173; 524/109; 524/140; 524/297; 524/313; 524/590; 524/773; 528/74.5; 528/80
[58] Field of Search ...................... 260/18 TN, 23 TN; 523/173; 524/313, 590, 773, 109, 140, 297; 528/74.5, 80

[56] References Cited

U.S. PATENT DOCUMENTS

| | | | |
|---|---|---|---|
| B 308,659 | 1/1976 | Kaufman et al. | 260/18 TN |
| 3,001,958 | 9/1961 | Schwarcman | 260/18 TN |
| 3,119,716 | 1/1964 | Wooster | 260/18 TN |
| 3,345,311 | 10/1967 | Ehrlich et al. | 260/18 TN |
| 3,666,696 | 5/1972 | Moore | 260/18 TN |
| 3,747,037 | 7/1973 | Earing | 260/18 TN |
| 3,748,294 | 7/1973 | Kershaw et al. | 524/773 |
| 4,008,197 | 2/1977 | Brauer et al. | 260/31.6 |
| 4,168,258 | 9/1979 | Brauer et al. | 260/31.8 R |
| 4,240,939 | 12/1980 | Kostic | 106/7 |
| 4,272,377 | 6/1981 | Gerlach et al. | 260/18 TN |

FOREIGN PATENT DOCUMENTS

| | | |
|---|---|---|
| 84933 | 10/1971 | German Democratic Rep. ... 260/18 TN |

*Primary Examiner*—Ronald W. Griffin
*Attorney, Agent, or Firm*—Harris, Kern, Wallen & Tinsley

[57] ABSTRACT

A vegetable oil extended polyurethane system comprising the reaction product of an isocyanate terminated polyisocyanate with a polyol in the presence of a vegetable oil and, optionally, a plasticizer, said polyurethane systems being applicable for use as reenterable encapsulants for sealing insulated electrical devices, as hard, permanent encapsulants and as general polyurethane elastomers.

12 Claims, No Drawings

VEGETABLE OIL EXTENDED POLYURETHANE SYSTEMS

The invention relates to a vegetable oil extended polyurethane which may, for example, be formulated as a non-spewing material for use in reclaiming or sealing electrical devices.

It is well-known in the art to extend polymers such as polyurethanes. The extended material will then be designated for use in a desired area of utility. Typical of such extending agents is mineral oil, such mineral oil extended polyurethanes being disclosed in U.S. Pat. No. 3,714,110 and U.S. Pat. No. 3,747,037.

It has also been determined that the mineral oil extended polyurethane is useful in the reclamation and protection of insulated electric devices. Such a device may, for example, be underground telephone cables which are exposed to fluid contaminants. These contaminants can seriously impair the electrical and mechanical properties of the device. The protectant material is pumped into the cable to remove water that has penetrated into interior free spaces. The material is pumped at low viscosity to achieve appropriate distribution and then cures in place to a high viscosity. The cured material then acts as a hydrophobic barrier to subsequent water penetration. The material may also be utilized as an encapsulant in sealing sections of cable. In this manner, the material serves to prevent, from the outset, the penetration of fluid contaminants.

A mineral oil extended polyurethane useful for this purpose was disclosed in U.S. Pat. No. 4,008,197. Thus, the patent defined a cured, cross-linked, mineral oil extended polyurethane prepared from specified polyurethanes and specified coupling agents, the latter agents being indicated as necessary to compatibilize the mineral oil with the cross-linking urethane elastomer. Disadvantages of such systems were, however, discovered and described in U.S. Pat. No. 4,168,258. Thus it was alleged that with the earlier mineral oil extended polyurethanes, the mineral oil tended to migrate towards the grease which is frequently present in newer insulated electrical devices. The migration was indicated as causing the formation of an oily film at the grease interface which tended to decrease the reclamation and encapsulant effectiveness. In order to avoid these difficulties, the patent specifically defined a polyurethane-mineral oil-coupling agent formulation relying on the presence of a polydiene moiety in the polyurethane structure. Mineral oil remained as the extending agent, with the stated preference for including some aromatic carbon content therein.

It has been determined, however, that such mineral oil extended systems exhibit certain disadvantages. Primary among these disadvantages is an increased volatility. As a result of this elevated volatility, particularly at the higher temperatures which are frequently encountered, the conformation of the cured polyurethane is compromised thereby reducing the effectiveness of the system as a reclaiming agent or encapsulant.

It is therefore the primary object of this invention to provide an extended polyurethane system which is applicable for a broad range of uses, particularly as a reclaimant and encapsulant for telecommunication cable.

It is another object to provide such a system which eliminates or significantly reduces the disadvantages encountered with the prior art systems.

It is still another object to provide a new extending agent for said systems which likewise improves upon extending agents of the prior art.

It is further object to provide extended polyurethane formulations which are defined in accordance with specific end use applications.

Various other objects and advantages of this invention will be readily apparent from the following detailed description thereof.

It has now been surprisingly found that by utilizing vegetable oils as the extending agent for polyurethanes, the resulting systems are well suited for a number of end use applications including hard permanent encapsulants, cable reclamation, and as general polyurethane elastomers. Thus, such vegetable oil extended polyurethanes comprise a specified polyurethane, a vegetable oil and, where required such as for reclamation and encapsulation, a specified plasticizer agent. The vegetable oils are characterized by low viscosity, low volatility, good electrical properties, high flash point, low pour point and absence of cracking or stressing tendencies on polycarbonate connectors.

When used in the area of reclamation and encapsulation, the vegetable oil extended polyurethane provides excellent performance characteristics in possessing the low viscosities necessary for initial introduction into the cable, being able to retain such low viscosities for a period of time sufficient to enable it to fill the length of the free spaces in the cable or form a complete encapsulating cover, being able to displace and/or repel fluid contaminants and then cure to form a gel-like urethane structure which neither spews forth nor exudes the vegetable oils. The gel structure is of sufficient rigidity to provide an excellent protective barrier, yet can be readily cut and removed if reentry is desired. The polyurethane is noncorrosive to the copper wire and compatible with conventionally used polycarbonate connectors as well as with polymeric materials utilized in cable manufacture. The system is also convenient to handle and apply in the field.

The polyurethane which is used in the vegetable oil extended polyurethane of the present invention is generally prepared by reacting approximately stoichiometric amounts of a polyisocyanate with polyol. In a preferred embodiment, the polyisocyanate is a polyisocyanate prepolymer which is in turn prepared by reacting an excess of a polyisocyanate compound with a polyol in a manner well known in the art. The polyisocyanate prepolymer is then reacted with the polyol in the presence of the vegetable oil and the plasticizer to form the vegetable oil extended polyurethane. In a second embodiment, the polyisocyanate is a polyisocyanate compound which directly reacts with the polyol in the presence of the vegetable oil and the plasticizer to form the vegetable oil extended polyurethane.

The polyisocyanate compound which is used in the preparation of the polyisocyanate prepolymer or which is reacted with the polyol to form the polyurethane may be an aliphatic polyisocyanate, a cycloaliphatic polyisocyanate or an aromatic polyisocyanate. Typical of such polyisocyanate compounds are 3-isocyanatomethyl 3,5,5-trimethylcyclohexyl isocyanate (IPDI), toluene diisocyanate (TDI), 4,4'-diphenylmethane diisocyanate (MDI), polymethylene polyphenylisocyanate, 1,5-naphthalene diisocyanate, phenylene diisocyanates, 4,4'-methylene bis-(cyclohexylisocyanate), hexamethylene diisocyanate, biuret of hexamethylene diisocyanate, 2,2,4-trimethylhexamethylene diisocyanate and combinations thereof, as well as related aromatic, aliphatic and cycloaliphatic polyisocyanates which may be substituted with other organic or inorganic groups that do not adversely affect the course of the reaction.

The term "aliphatic," as used herein, includes those carbon chains which are substantially non-aromatic in nature. They may be saturated or unsaturated, unbranched, branched or cyclic in configuration and may contain substituents which do not adversely affect migration. Such aliphatic isocyanates generally have an equivalent weight of from 60 to 160 and a viscosity of 1.0 to 1500.0 centipoises at 25° C. Exemplary of the liquid long chain aliphatic polyisocyanates are dodecyl diisocyanate, tridecyl diisocyanate, and the like. Polymethylene polyphenylisocyanate is commercially available from Mobay Chemicals under the trademark Mondur MRS. Methylene diisocyanate is commercially available as a stabilized liquid form from Upjohn under the trademark Isonate 143L or from Mobay under the trademark Mondur CD. Various polyarylene polyisocyanates are commercially available from Upjohn under the trademark PAPI. Isocyanate terminated prepolymers are available from REN Plastics such as DC-1688-5 based on PAPI 901 and G-900 based on Hylene W (DuPont), a cycloaliphatic isocyanate.

The polyol which is reacted with the polyisocyanate compound and the polyol which is reacted with the prepolymer is selected from the group consisting of castor oil, polyether polyols, hydroxyl bearing homopolymers of dienes, hydroxyl bearing copolymers of dienes, amine-based polyols, polymeric polyols, and combinations thereof. Such polyols generally have an equivalent weight of from 30 to 6000 and a viscosity of from 1.0 to 20,000 centipoises at 25° C.–60° C.

The castor oil which may be used in the preparation of the vegetable oil extended polyurethane is primarily composed of ricinolein which is a glyceride of ricinoleic acid. A typical castor oil comprises a mixture of about 70% pure glyceryl triricinoleate and about 30% glyceryl diricinoleate-monooleate or monolinoleate and is available from NL Industries as DB Oil. Ricinoleate-based polyols are also available from Spencer-Kellogg as DI Castor Oil.

Suitable polyether polyols include aliphatic alkylene glycol polymers having an alkylene unit composed of at least three carbon atoms. These aliphatic alkylene glycol polymers are exemplified by polyoxypropylene glycol and polytetramethylene ether glycol. Also, trifunctional compounds exemplified by the reaction product of trimethylol propane and propylene oxide may be employed. A typical polyether polyol is available from Union Carbide under the designation PPG-425.

The hydroxyl bearing homopolymers of dienes or hydroxyl bearing copolymers of dienes are prepared from dienes which include unsubstituted, 2-substituted or 2,3-disubstituted 1,3-dienes of up to about 12 carbon atoms. Preferably, the diene has up to about 6 carbon atoms and the substituents in the 2- and/or 3-position may be hydrogen, alkyl, generally lower alkyl, e.g., of about 1 to about 4 carbon atoms, substituted aryl, unsubstituted aryl, halogen and the like. Typical of such dienes are 1,3-butadiene, isoprene, chloroprene, 2-cyano-1,3-butadiene, 2,3-dimethyl-1,3,butadiene, and the like. The preferred dienes are 1,3-butadiene and isoprene. A hydroxyl terminated polybutadiene is available from Arco Chemicals under the designation Poly BD R-45 HT.

A wide variety of aromatic and aliphatic diamines may form part of the amine-based polyols, such as N,N-bis(2-hydroxypropyl)aniline and N,N,N',N'-tetrakis(2-hydroxypropyl)ethylenediamine. A typical amine-based polyol is available from Upjohn under the designation ISONOL 100, while a typical aliphatic amine—based polyol is available from BASF under the designation QUADROL.

Polymeric polyols can be described as conventional polyols with a stable dispersion of vinyl polymers. For example, U.S. Pat. No. 4,104,236 discloses such polyols with acrylonitrile-styrene polymer. A further typical polyol is available from Union Carbide under the designation NIAX 24-32.

The vegetable oils as utilized herein are commercially available. Typical oils include soybean, safflower, corn, sunflower, linseed, oiticica, coconut, cottonseed, peritta, palm, olive, rape and peanut oils and mixtures thereof. These oils are characterized by low viscosity and low volatility. The oils are utilized in concentration ranging from about 1–80%, by weight of the total extended urethane system, and preferably 5 to 60%, by weight.

In order to generally enhance the compatibility of the vegetable oils with the various urethane components, a cycloaliphatic alcohol may be added to the system in amounts ranging up to about 25%, by weight of the vegetable oil, and preferably up to about 5%, by weight. Typical alcohols include cyclohexanol, cyclopentanol, cyclobutanol, cyclododecanol, 1,2-cyclohexanediol, cyclohexylmethanol, and the like.

The viscosity of the system may be further reduced by the presence of a plasticizer in amounts ranging up to about 50% by weight of the total system, and preferably in a maximum of about 13%, by weight. Such plasticizers are non-reactive or substantially non-reactive with the polyurethane forming reactants. The applicable plasticizers may be saturated or unsaturated and may be aliphatic, cycloaliphatic, or aromatic-aliphatic. Typical materials include phthalates such as dibutyl phthalate, diundecylphthalate, dioctylphthalate, diisononylphthalate, diisodecylphthalate, 2-ethylhexyl phthalate and mixtures of n-$C_7$, $C_9$, $C_{10}$ and $C_{11}$ phthalates; adipates such as diisodecyladipate and n-octyl-n-decyl adipate; gluterates; fumarates; sebacates; citrates; phosphates; and the like, as well as polymeric esters such as Plastolein 9720 from Emery Industries and epoxidized vegetable oils derived from linseed, soybean, tall oil, and the like.

The instant vegetable oil extended materials are preferably prepared at the application site by admixing the resin system with the hardener system. Depending on the desired utility, the resin and hardener are utilized in amounts meeting the stoichiometric requirements. The resin component comprises the polyurethane prepolymer or polyisocyanate and the plasticizer, if present. The hardener component comprises the polyol and the vegetable oil. The catalyst and optional additives such as fungicides, pigments, anti-oxidants, moisture scavengers, and the like, will generally be added to the hardener component. Catalysts are known to those skilled in the art and may comprise, for example, heavy metals utilized in amounts of about 0.1% metal, by weight of hardener component, e.g. lead, tin or mercury, or may comprise amines. Upon mixing the components, stable gels will form generally within about thirty minutes at room temperature.

As noted, the vegetable oil extended polyurethanes possess the desired properties for a range of utilities, with primary emphasis on utilities such as reenterable encapsulants and reclaimants for insulated electrical devices. Thus, they are initially sufficiently fluid to be introduced into the core of the cable or a mold surrounding the area of concern and retain their fluidity for a period of time sufficient to fill all the interior free spaces. In its reclaiming function, the polyurethane will thus displace the liquid penetrants in the free spaces. Thereafter, a stable gel forms within a reasonable period of time to provide a seal against penetration of water or other fluid materials. Where reenterability is desired, the selected polyurethane provides a gel which is sufficiently soft so as to be readily removed. The presence of the vegetable oil minimizes volatility thereby providing increased stability of conformation to the resulting gel. The gelled systems have excellent electrical properties, particularly good insulating properties as a result of low dielectric constant and high volume resistivity. Furthermore, there is no exudation of extender and excellent compatibility with materials employed in the cable construction and with polycarbonate connectors.

In addition, the instant extended polyurethanes can be utilized as hard volume (permanent) encapsulants and for general polyurethane elastomeric uses.

The following examples illustrate the preferred embodiments of the invention. In these examples, all parts given are by weight unless otherwise specified.

EXAMPLE 1

This example illustrates the preparation of a typical vegetable oil extended polyurethane system of this invention which is intended for use as a reenterable encapsulant.

1 Resin—(A)

30 parts Methylenediisocyanate (1)
70 parts Diisodecylphthalate.

Hardener—(M)

66.44 parts Sunflower oil
33.00 parts Hydroxyl terminated polybutadiene (2)
0.50 parts Antioxidant
0.02 parts Fungicide
0.04 parts Tin catalyst.
(1) MONDUR CD from Mobay Chemicals
(2) POLY-BD R45 HT from Arco Chemicals.

A mix of 15 parts resin and 100 parts hardener was prepared which formed a stable, firm gel after minutes. The initial mix exhibited a pour point of less than 10° C. with a hardener viscosity of less than 1500 centipoises at 4.4° C. The resulting gel was non-bleeding, tack free, flexible and friable, thereby indicating its ready applicability as a reenterable encapsulant.

EXAMPLE 2

| | parts | | | | | | | | |
|---|---|---|---|---|---|---|---|---|---|
| Additional resin system: | B | C | D | E | F | G | H | I | J |
| Methylenediisocyanate (3) | 30 | — | — | 24.05 | 80.0 | — | 29.59 | — | — |
| Polymethylene polyphenyl isocyanate (4) | — | 35 | — | — | — | 27.3 | — | 48.1 | — |
| Polymethylene polyphenyl isocyanate (5) | — | — | 24.05 | — | — | 27.3 | — | — | — |
| Hydroxyl terminated polybutadiene (2) | — | — | 12.36 | 12.36 | — | — | — | 24.7 | 61.8 |
| Methylenediisocyanate (1) | — | — | — | — | 80.0 | — | — | — | — |
| Cycloaliphatic isocyanate (6) | — | — | — | — | — | — | — | — | 38.2 |
| Diisodecylphthalate | 70 | 65 | — | — | — | — | — | — | — |
| Diundecylphthalate | — | — | — | — | — | — | — | 25.0 | — |
| n-Alkyl C9–C10–C11 phthalate | — | — | 62.5 | 62.5 | — | — | — | — | — |
| Polypropylene glycol | — | — | 1.09 | 1.09 | — | — | — | — | — |
| Partially hydrogenated terphenyl (7) | — | — | — | — | 20.0 | 72.7 | — | — | — |
| Polyether diol (8) | — | — | — | — | — | — | — | 2.2 | — |
| Polymeric polyol (9) | — | — | — | — | — | — | 70.41 | — | — |

(3) ISONATE 143 L from Upjohn
(4) MONDUR MRS from Mobay Chemicals
(5) PAPI 901 from Upjohn
(6) HYLENE W from DuPont
(7) HB-40 process oil from Monsanto
(8) PLURACOL P-1010 from BASF-Wyandotte
(9) NIAX 24-32 from Union Carbide Additional hardener systems:

| | Parts | |
|---|---|---|
| | N | O |
| Corn Oil | 66.25 | — |
| Sunflower Oil | — | 66.25 |
| Hydroxyl terminated polybutadiene (2) | 33.0 | 33.0 |
| Antioxidant | 0.25 | 0.25 |
| Fungicide | 0.25 | 0.25 |
| Tin catalyst | 0.25 | 0.25 |

Extended polyurethane systems:

| # | Resin | Hardener | Weight Ratio Resin:Hardener |
|---|---|---|---|
| 2 | B | M | 15:100 |
| 3 | C | M | 12:100 |
| 4 | D | M | 20.5:100 |
| 5 | E | M | 20.5:100 |
| 6 | F | N | 5.5:100 |
| 7 | G | N | 15:100 |
| 8 | H | O | 20:100 |
| 9 | I | O | 10:100 |

-continued

| # | Resin | Hardener | Weight Ratio Resin:Hardener |
|---|-------|----------|------------------------------|
| 10 | J | O | 14:100 |

Each of these combinations produced non-bleeding, tack free, flexible solids. They were identified for use as reenterable encapsulants in view of their stable gel-like configuration, their initial viscosity characteristics and their excellent electrical properties.

EXAMPLE 3

Additional resin systems:

Resin (K)

35 parts Polymethylene polyphenyl isocyanate (4)
65 parts Commercial vegetable oil mixture (10).

Resin (L)

100 parts Polymethylene polyphenyl isocyanate (4).
Additional hardener systems:

| | parts | | | | | | | | | | | |
|---|---|---|---|---|---|---|---|---|---|---|---|---|
| | P | Q | R | S | T | U | V | W | X | Y* | Z* | AA* |
| Commercial vegetable oil mixture (10) | 24.0 | — | — | 48.0 | — | — | 67.3 | — | — | 83.0 | — | — |
| Corn Oil | — | 24.0 | — | — | 48.0 | — | — | 67.3 | — | — | 83.0 | — |
| Sunflower Oil | — | — | 24.0 | — | — | 48.0 | — | — | 67.3 | — | — | 83.0 |
| Hydroxyl terminated polybutadiene (2) | 30.2 | 30.2 | 30.2 | 30.2 | 30.2 | 30.2 | 30.2 | 30.2 | 30.2 | 13.0 | 13.0 | 13.0 |
| Dipropylene glycol | 1.8 | 1.8 | 1.8 | 1.8 | 1.8 | 1.8 | 1.8 | 1.8 | 1.8 | 2.0 | 2.0 | 2.0 |
| Benzoyl octyl phthalate | 43.5 | 43.5 | 43.5 | 19.6 | 19.6 | 19.6 | — | — | — | — | — | — |
| Antioxidant | — | — | — | — | — | — | 0.5 | 0.5 | 0.5 | — | — | — |
| Fungicide | — | — | — | — | — | — | .02 | .02 | .02 | — | — | — |
| Tin catalyst | 0.5 | 0.5 | 0.5 | 0.4 | 0.4 | 0.4 | 0.2 | 0.2 | 0.2 | 2.0 | 2.0 | 2.0 |

(10) WESSON OIL
*Exhibited reduced reaction rate

Extended polyurethane systems:

| # | Resin | Hardener | Weight Ratio Resin: Hardener |
|---|-------|----------|------------------------------|
| 11 | K | P | 20.5:100 |
| 12 | K | Q | 20.5:100 |
| 13 | K | R | 20.5:100 |
| 14 | K | S | 20.5:100 |
| 15 | K | T | 20.5:100 |
| 16 | K | U | 20.5:100 |
| 17 | K | V | 20.5:100 |
| 18 | K | W | 20.5:100 |
| 19 | K | X | 20.5:100 |
| 20 | L | Y | 20.5:100 |
| 21 | L | Z | 6.0:100 |
| 22 | L | AA | 6.0:100 |

These combinations generally exhibited performance characteristics comparable to those of the previously recited systems.

In summary, this invention provides novel vegetable oil extended polyurethane systems. Variations may be made in procedures, proportions and materials without departing from the scope of the invention as defined by the following claims.

What is claimed is:

1. A vegetable oil extended polyurethane system consisting essentially of the reaction product of an isocyanate terminated polyisocyanate with a polyol in the presence of vegetable oil, the vegetable oil being present in a range of from about 1 to 80%, by weight of the total extended system, and being selected from the group consisting of soybean, safflower, corn, sunflower, linseed, oiticica, coconut, cottonseed, peritta, palm, olive, rape and peanut oils and mixtures thereof.

2. The system of claim 1, wherein said polyisocyanate is selected from the group consisting of aliphatic, cycloaliphatic and aromatic polyisocyanates.

3. The system of claim 1, wherein said polyisocyanate is a polyisocyanate prepolymer prepared by reacting an excess of a polyisocyanate compound and a polyol.

4. The system of claim 2, wherein said polyisocyanate is polymethylene polyphenylisocyanate or methylenediisocyanate.

5. The system of claim 1, wherein said polyol is selected from the group consisting of castor oil, polyether polyols, hydroxyl-bearing homopolymers of dienes, hydroxyl-bearing copolymers of dienes, amine-based polyols, polymeric polyols and mixtures thereof.

6. The system of claim 5, wherein said polyol is a hydroxyl terminated polybutadiene.

7. A vegetable oil extended polyurethane system consisting essentially of the reaction product of an isocyanate terminated polyisocyanate with a polyol in the presence of vegetable oil, the vegetable oil being present in a range of from about 1 to 80%, by weight of the total extended system, and a plasticizer in a concentration of from about 1 to 50%, by weight of the total extended system, said vegetable oil being selected from the group consisting of soybean, safflower, corn, sunflower, linseed, oiticica, coconut, cottonseed, peritta, palm, olive, rape and peanut oils and mixtures thereof.

8. The system of claim 7, wherein said plasticizer is selected from the group consisting of phthalates, adipates, gluterates, fumarates, sebacates, citrates, phosphates, polymeric esters, epoxidized vegetable oils and mixtures thereof.

9. The system of claim 8, wherein said plasticizer is diisodecylphthalate.

10. The system of claim 7 comprising the reaction product of 15 parts of a blend of 30 parts of methylenediisocyanate and 70 parts of diundecylphthalate with 100 parts of a blend of 66.44 parts of sunflower oil, 33.0 parts hydroxyl terminated polybutadiene, 0.5 parts antioxidant, 0.02 parts fungicide and 0.04 parts tin catalyst, all parts being by weight.

11. The system of claim 7 comprising the reaction product of 20.5 parts of a blend of 24.05 parts of polymethylene polyphenylisocyanate, 62.5 parts of n-alkyl $C_9$, $C_{10}$, $C_{11}$ phthalate, 12.36 parts of hydroxyl terminated polybutadiene and 1.09 parts of polypropylene glycol with 100 parts of a blend of 66.44 parts of sunflower oil, 33.0 parts hydroxyl terminated polybutadiene, 0.5 parts antioxidant, 0.02 parts fungicide and 0.04 parts tin catalyst, all parts being by weight.

12. A process for providing a fluid impervious protective seal around insulated electrical devices which comprises introducing the polyurethane system of claim 1 or 7 into a confined space surrounding the section of said device to be protected and allowing said system to cure to a gel-like consistency.

* * * * *